(12) United States Patent
Van Heerden (10) Patent No.: US 12,379,190 B2
(45) Date of Patent: Aug. 5, 2025

(54) BALLISTIC-RESISTANT COMPOSITE WITH MALEIC ANHYDRIDE-GRAFTED POLYPROPYLENE

(71) Applicant: BARRDAY CORP., Charlotte, NC (US)

(72) Inventor: Jason Van Heerden, Cambridge (CA)

(73) Assignee: BARRDAY CORP., Charlotte, NC (US)

( * ) Notice: Subject to any disclaimer, the term of this patent is extended or adjusted under 35 U.S.C. 154(b) by 290 days.

(21) Appl. No.: 17/797,529

(22) PCT Filed: Feb. 8, 2021

(86) PCT No.: PCT/US2021/017085
§ 371 (c)(1),
(2) Date: Aug. 4, 2022

(87) PCT Pub. No.: WO2021/225658
PCT Pub. Date: Nov. 11, 2021

(65) Prior Publication Data
US 2023/0058501 A1    Feb. 23, 2023

Related U.S. Application Data

(60) Provisional application No. 62/970,837, filed on Feb. 6, 2020.

(51) Int. Cl.
*F41H 5/04* (2006.01)
*B32B 5/02* (2006.01)
(Continued)

(52) U.S. Cl.
CPC ............. *F41H 5/0485* (2013.01); *B32B 5/02* (2013.01); *B32B 27/32* (2013.01); *B32B 27/40* (2013.01);
(Continued)

(58) Field of Classification Search
CPC ......... F41H 5/0485; B32B 5/02; B32B 27/32; B32B 27/40; B32B 2262/0253; B32B 2571/02
See application file for complete search history.

(56) References Cited

U.S. PATENT DOCUMENTS 6,270,851 B1 * 8/2001 Lee ........................ B29C 70/50
156/441
8,871,658 B2   10/2014 Van Heerden
(Continued)

FOREIGN PATENT DOCUMENTS

CN    107903508    4/2018
CN    109897282    6/2019
(Continued)

OTHER PUBLICATIONS

International Preliminary Report on Patentability for International Application No. PCT/US2021/017085 mailed Aug. 18, 2022.
(Continued)

*Primary Examiner* — Camie S Thompson
(74) *Attorney, Agent, or Firm* — Carlson, Gaskey & Olds, P.C.

(57) ABSTRACT

A ballistic-resistant composite includes at least one layer that has a network of ballistic fibers and a resin matrix. The resin matrix includes maleic anhydride-grafted polypropylene (MA-g-PP).

12 Claims, 3 Drawing Sheets

(51) Int. Cl.
*B32B 27/32* (2006.01)
*B32B 27/40* (2006.01)

(52) U.S. Cl.
CPC ... *B32B 2260/021* (2013.01); *B32B 2260/046* (2013.01); *B32B 2262/0253* (2013.01); *B32B 2571/02* (2013.01)

(56) References Cited

U.S. PATENT DOCUMENTS

| | | |
|---|---|---|
| 2010/0297388 A1 | 11/2010 | Dagher et al. |
| 2016/0108194 A1 | 4/2016 | Topolkaraev et al. |
| 2017/0217140 A1* | 8/2017 | Han .......................... B32B 5/24 |
| 2019/0240934 A1* | 8/2019 | Prins ..................... B29C 70/202 |
| 2020/0002483 A1 | 1/2020 | Sinha et al. |

FOREIGN PATENT DOCUMENTS

| | | | | |
|---|---|---|---|---|
| JP | H11181181 | * | 7/1999 | |
| WO | WO-2017188789 A1 | * | 11/2017 | ................ C08J 5/04 |
| WO | WO-2018152294 A1 | * | 8/2018 | ............. B32B 27/32 |

OTHER PUBLICATIONS

Supplementary European Search Report for European Patent Application No. 21799950.7 mailed Jan. 24, 2024.

Kapoor, R., Pangeni, L., Bandaru, A.K., Ahmad, S., and Bhatnagar, N. (2016). High strain rate compression response of woven Kevlar reinforced polypropylene composites. Composites Part B: Engineering. vol. 89. Mar. 15, 2016. pp. 374-382.

Kim, H-S, Lee, B-H, Choi, S-W, Kim, S., and Kim, H-J. (2007). The effect of types of maleic anhydride-grafted polypropylene (MAPP) on the interfacial adhesion properties of bio-flour-filled polypropylene composites. Composites: Part A. vol. 38. pp. 1473-1482.

Girones, J., Pimenta, M.T.B., Vilaseca, F., Carvalho, A.J.F., Mutje, P. and Curvelo, A.A.S. (2008). Blocked disocyanates as reactive coupling agents: Application to pine fiber-polypropylene composites. Carbohydrate Polymers. Abstract p. 107, col. 1, third paragraph; p. 112, col. 2, third paragraph.

International Search Report and Written Opinion for International Application No. PCT/US2021/017085 mailed Nov. 3, 2021.

* cited by examiner

BALLISTIC-RESISTANT COMPOSITE WITH MALEIC ANHYDRIDE-GRAFTED POLYPROPYLENE

CROSS-REFERENCE TO RELATED APPLICATION

This application claims priority to U.S. Provisional Application No. 62/970,837 filed Feb. 6, 2020.

BACKGROUND

Ballistic-resistant composites are used in various types of soft and hard armors. Hard armor is used in such articles as helmets, vehicles, riot shields, helicopters, cargo planes, and personal protective inserts. Soft armor is used in military vests, police vests, blast-blankets or ballistic curtains or in applications where rigid armor is not practical. Ballistic-resistant composites can include layers that have high performance fibers in a resin matrix. Rigid resin matrices are often formed from thermosetting resins, while semi-rigid or flexible resin matrices may be formed from thermoplastic resins or elastomers and/or low resin content thermosetting resins. Fabrication of some armors involves stacking multiple layers of ballistic-resistant composites and compressing the stack under heat to produce a laminate sheet. For some hard armors laminate sheets may be further processed with heat and pressure for incorporation into an end use product.

SUMMARY

A ballistic-resistant composite accordingly to the present disclosure includes at least one layer that has a network of ballistic fibers and a resin matrix. The resin matrix includes maleic anhydride-grafted polypropylene (MA-g-PP).

In a further embodiment of any of the foregoing embodiments, the maleic anhydride-grafted polypropylene is maleic anhydride-grafted polypropylene block copolymer.

In a further embodiment of any of the foregoing embodiments, the resin matrix additionally includes polyurethane.

In a further embodiment of any of the foregoing embodiments, the resin matrix includes, by weight, 1% to 70% of the MA-g-PP.

In a further embodiment of any of the foregoing embodiments, the resin matrix includes, by weight, 25% to 50% of the MA-g-PP.

In a further embodiment of any of the foregoing embodiments, the polyurethane includes a blocked isocyanate composed of isocyanate bonded with a blocking agent selected from the group consisting of wherein the blocking agent is selected from the group consisting of phenol, nonyl phenol, β-dicarbonyl compounds, methylethylketoxime, alcohols, ε-caprolactam, amides, imidazoles, pyrazoles, and combinations thereof.

In a further embodiment of any of the foregoing embodiments, the at least one layer includes, by weight, from 5% to 40% of the resin matrix.

In a further embodiment of any of the foregoing embodiments, the network of ballistic fibers includes polyethylene fibers.

In a further embodiment of any of the foregoing embodiments, the network of ballistic fibers includes ultra-high molecular weight polyethylene fibers.

In a further embodiment of any of the foregoing embodiments, the at least one layer includes two of the layers laminated together.

In a further embodiment of any of the foregoing embodiments, the MA-g-PP has, by weight, 0.1% to 10% of maleic anhydride.

In a further embodiment of any of the foregoing embodiments, the MA-g-PP has, by weight, 0.5% to 5% of maleic anhydride.

In a further embodiment of any of the foregoing embodiments, the MA-g-PP has, by weight, 1% to 4% of maleic anhydride.

In a further embodiment of any of the foregoing embodiments, the MA-g-PP has a molecular weight of 5,000 to 150,000.

In a further embodiment of any of the foregoing embodiments, the MA-g-PP has a molecular weight of 30,000 to 80,000.

In a further embodiment of any of the foregoing embodiments, the at least one layer has a single layer that has an areal density of 20 grams per square meter to 500 grams per square meter.

In a further embodiment of any of the foregoing embodiments, the resin matrix additionally includes polyurethane, the resin matrix includes, by weight, 25% to 50% of the MA-g-PP, the MA-g-PP has, by weight, 0.5% to 5% of maleic anhydride, the MA-g-PP has a molecular weight of 30,000 to 80,000, and the at least one layer has a single layer that has an areal density of 20 grams per square meter to 500 grams per square meter.

In a further embodiment of any of the foregoing embodiments, the MA-g-PP has a molecular weight of 30,000 to 80,000, the network of ballistic fibers includes ultra-high molecular weight polyethylene fibers, and the MA-g-PP has, by weight, 0.5% to 5% of maleic anhydride.

In a further embodiment of any of the foregoing embodiments, the resin matrix additionally includes polyurethane, the resin matrix includes, by weight, 25% to 50% of the MA-g-PP, the at least one layer includes, by weight, from 5% to 40% of the resin matrix, the network of ballistic fibers includes ultra-high molecular weight polyethylene fibers, the MA-g-PP has, by weight, 0.5% to 5% of maleic anhydride, the MA-g-PP has a molecular weight of 30,000 to 80,000, and the at least one layer has a single layer that has an areal density of 20 grams per square meter to 500 grams per square meter.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
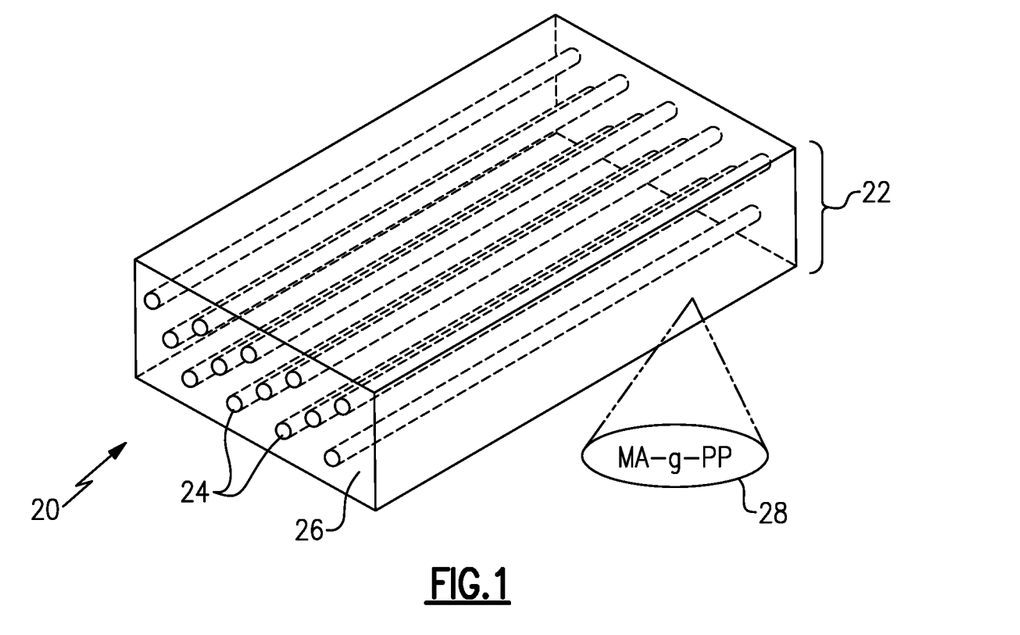
FIG. 1 illustrates a ballistic-resistant composite.

FIG. 1 schematically illustrates a representative portion of a ballistic-resistant composite 20 in the form of a layer 22.

The layer 22 may be fabricated to desired sizes but typically will be produced as a thin sheet that can be divided into ply pieces. The layer 22 includes a network of ballistic fibers 24 and a resin matrix 26. The resin matrix 26 includes maleic anhydride-grafted polypropylene (MA-g-PP), represented at 28. The "grafted" indicates that the maleic anhydride is covalently bonded to the polypropylene.

A "fiber" as used herein is an elongated body that is significantly longer than it is wide. The form of the "fiber" or "fibers" is not particularly limited and may be a monofilament, multifilament, ribbon, strip, yarn, or tape, and may be continuous or discontinuous, with a regular or irregular cross-section.

A "ballistic fiber" refers to a high-performance fiber that is engineered for ballistic resistance. A ballistic fiber may also be considered to be a "high tenacity fiber" that has a tenacity of about 7 g/d (grams per denier) or more. Even higher tenacities may facilitate performance enhancement, such as greater than 10 g/d, greater than 16 g/d, greater than 22 g/d, greater than 28 g/d, or greater than 50 g/d. A ballistic fiber may further have a tensile modulus of about 150 g/d or more (ASTM 2256), and in some examples a modulus of 2000 g/d or more, and an energy-to-break of about 8 J/g (Joules per gram) or more (ASTM D2256).

In the illustrated example, the network of ballistic fibers 24 are ultra-high molecular weight polyethylene (UHMWPE) ballistic fibers. Although UHMWPE ballistic fibers are useful for high performance ballistic resistance, it is to be understood that the network of ballistic fibers 24 is not limited thereto. Other examples of the network of ballistic fibers 24 include, but are not limited to, highly oriented high molecular weight polyolefin fibers, high modulus or high tenacity polyethylene fibers and polypropylene fibers, aramid fibers, aromatic heterocyclic co-polyamide fibers, terpolyaramide fibre, polybenzazole fibers, polyvinyl alcohol fibers, polyacrylonitrile fibers, liquid crystal copolyester fibers, polyamide fibers, polyester fibers, glass fibers, graphite fibers, carbon fibers, basalt or other mineral fibers, rigid rod polymer fibers, and mixtures and blends thereof.

The polymers forming the network of ballistic fibers 24 may be high-strength, high tensile modulus fibers. Examples include polyolefin fibers, including high density and low density polyethylene, extended chain polyolefin fibers, such as highly oriented, high molecular weight polyethylene fibers, such as ultra-high molecular weight polyethylene fibers, and polypropylene fibers, such as ultra-high molecular weight polypropylene fibers. Additional examples include para-aramid fibers, polyamide fibers, polyethylene terephthalate fibers, heterocyclic co-polyamide fibers, terpolyaramide fibre, polyethylene naphthalate fibers, extended chain polyvinyl alcohol fibers, extended chain polyacrylonitrile fibers, polybenzazole fibers, such as polybenzoxazole (PBO) and polybenzothiazole (PBT) fibers, liquid crystal copolyester fibers and other rigid rod fibers such as pyridobisimidazole-2, 6-diyl(2,5-dihydroxy-p-phenylene) (e.g., M5(R) fibers by Magellan Systems International of Richmond, Va. or as disclosed in U.S. Pat. Nos. 5,674,969, 5,939,553, 5,945,537, or 6,040,478). Additional examples include copolymers, block polymers and blends of the above materials. Example polyethylenes are extended chain polyethylenes having molecular weights of at least 500,000, at least one million, or between two million and five million. In some examples, the fibers are high-performance fibers such as extended chain polyethylene fibers, poly-para-phenylene terephthalamide fibers, which may also be referred to as aramid fibers (e.g., by DuPont (Kevlar®), Teijin (Twaron®), Kolon (Heracron®), or Hyosung Aramid), aromatic heterocyclic co-polyamides, which may also be referred to as modified para-aramids (e.g., Rusar®, Autex®), ultra-high molecular weight polyethylene (UHMWPE)(e.g., by Honeywell, DSM, and Mitsui under the trade names Spectra®, Dyneema®, and Tekmilon®, respectively, as well as Pegasus® yarn), poly(p-phenylene-2,6-benzobisoxazole) (PBO) (e.g., by Toyobo under the name Zylon®), and/ or polyester-polyarylate yarns (e.g., liquid crystal polymers produced by Kuraray under the trade name Vectran®). In some embodiments, industrial fibers such as nylon, polyester, polyolefin-based yarns (including polyethylene and polypropylene), could also be used.

Figure 2:
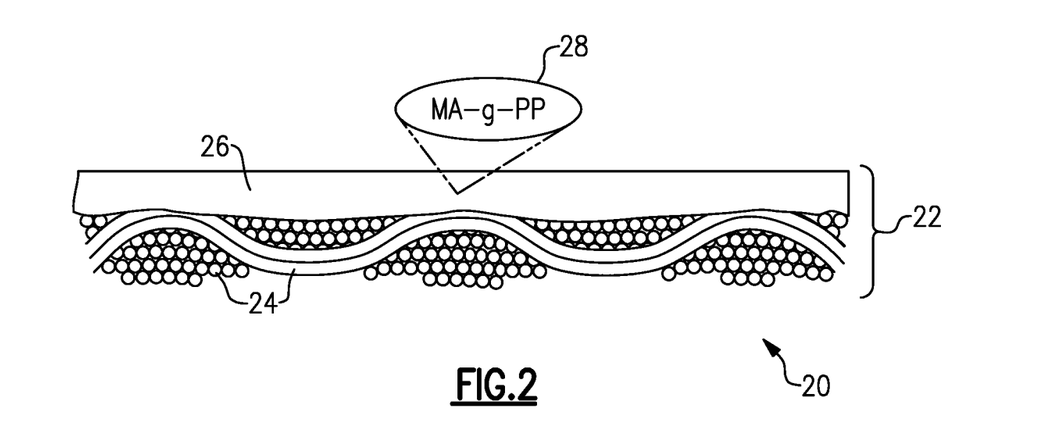
FIG. 2 illustrates another example of a ballistic-resistant composite.

The resin matrix 26 is continuous in the illustrated example and fully or substantially fully embeds the network of ballistic fibers 24. The form, however, of the resin matrix 26 is not limited but the resin matrix 26 is at least in contact with the network of ballistic fibers 24. In this regard, the resin matrix 26 may be a continuous or discontinuous layer on the network of fibers 24, which as above may in the form of monofilaments, multifilaments, ribbons, strips, yarns, or tapes. For instance, as shown in FIG. 2, the resin matrix 26 is a continuous layer on the network of fibers 24. The resin matrix 26 may be applied to the network of fibers 24 by any suitable technique, including but not limited to, spraying, dipping, roller coating, hot-melt coating, powder scatter coating, or as a cast thin film that is laminated to the network of ballistic fibers 24.

The ballistic-resistant composite 20 is comprised of, by weight percent based on the total weight of the composite 20, about 1% to about 98% of the resin matrix 26. More typically, the ballistic-resistant composite 20 will be comprised of about 5% to about 40% of the resin matrix 26, or about 10% to about 25% of the resin matrix 26.

Figure 3A:
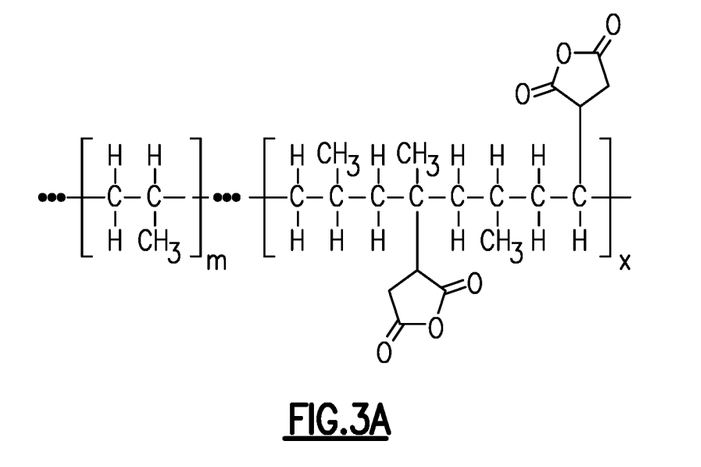
FIG. 3A illustrates a chemical structure for maleic anhydride grafted polypropylene.

As indicated above, the resin matrix 26 includes MA-g-PP, of which a proposed example chemical structure is shown in FIG. 3A. In the illustrated example, the Ma-g-PP is of a homopolymer variety in that polypropylene is the only polymer of the backbone polymer chain. The backbone includes polypropylene that has no grafted maleic anhydride and polypropylene that has grafted maleic anhydride. The maleic anhydride is atactic, although the stereochemistry will change, as discussed later in this disclosure. Alternatively, the MA-g-PP is a block copolymer, as shown for example in FIG. 3B. Here, the backbone again includes polypropylene that has no grafted maleic anhydride and polypropylene that has grafted maleic anhydride. In the block copolymer, the backbone additionally includes blocks of isobutylene. The chemical structure may vary in accordance with the number average molecular weights "m," "n," and "x." As non-limiting examples, "m" may be 120 to 10,000, "n" may be 60 to 5,000, and "x" may be 3 to 435. The term "the MA-g-PP" thus may refer herein to either the homopolymer or the block copolymer.

Figure 3B:
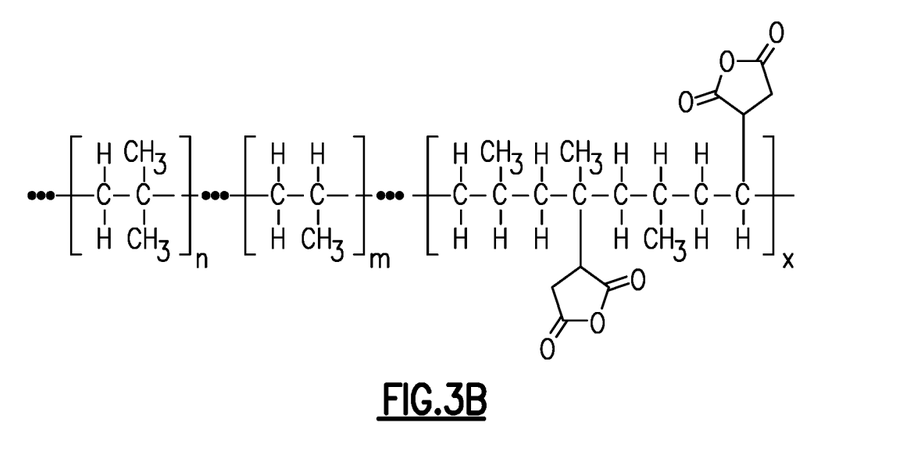
FIG. 3B illustrates a chemical structure for maleic anhydride grafted polypropylene block copolymer.

In general, the molecular weight of the MA-g-PP is 5,000 to 150,000, but more typically will be 30,000 to 80,000. The MA-g-PP has, by weight, 0.1% to 10% of maleic anhydride. In further examples, the maleic anhydride is at least 0.5% up to 5%, and in one specific example is 1% to 4%.

The MA-g-PP may be used as the only resin in the resin matrix 26 but more typically will be used in mixture with one or more additional resins, such as polyurethane. For instance, the resin matrix 26 includes, by weight, 1% to 70% of the MA-g-PP, and the remainder of the resin matrix 26 is the polyurethane. In further examples, the resin matrix 26 includes, by weight, 25% to 50% of the MA-g-PP, and the remainder is the polyurethane.

In an additional example, the polyurethane includes a blocked isocyanate that is composed of isocyanate bonded with a blocking agent. For instance, the blocking agent is selected from phenol, nonyl phenol, β-dicarbonyl compounds, methylethylketoxime, alcohols, ε-caprolactam, amides, imidazoles, pyrazoles, and combinations thereof.

The bonding between the isocyanate and the blocking agent is reversible in dependence on temperature. Thus, the isocyanate is blocked (i.e., the blocking agent is bonded with the isocyanate) at relatively low temperatures, deblocked (i.e., the blocking agent is not bonded to the isocyanate) at relatively high temperatures, and can be cycled between the blocked and deblocked states by adjusting the temperature. When the blocking agent is bonded with the isocyanate the blocking agent prevents the isocyanate from reacting (i.e., the blocked isocyanate is inert in the resin matrix 26), and when the blocking agent is not bonded to the isocyanate the isocyanate is reactive (i.e., the isocyanate is reactive in the resin matrix 26).

In general, the temperature at which initial deblocking is observed from the blocked state is called the deblocking temperature. Deblocking temperatures can be found in general literature and used as guidance in selecting useful blocked isocyanates for a particular implementation. Additionally, or alternatively, deblocking temperatures can be readily experimentally determined through a known measurement technique. Deblocking temperatures may be given in the literature as temperature ranges in order to encompass variations. Such ranges or variations do not hinder the understanding or practice of this disclosure, at least because ranges or variations in combination with the teachings of this disclosure will permit selection of one or more blocked isocyanates for a given implementation.

The resin matrix 26 may be cross-linkable by heating to a temperature that causes the isocyanate to liberate from the blocking agent and the liberated isocyanate to reactively cause cross-linking of the resin matrix 26. Such a temperature is equal to or above the deblocking temperature of the selected blocked isocyanate but will not be so high as to damage the network of fibers 24 or other constituents in the ballistic resistant composite 20, if present. At a minimum, the temperature will be below a temperature at which the network of fibers 24 degrades in the implemented process conditions (time, temperature, pressure, etc.).

In an example process for forming a layer 22 and a laminate, the network of fibers 24 is initially coated with the resin matrix 26. The coating can be applied using known techniques, such as impregnation, lamination, or powder coating. In some examples, the resin matrix 26 is applied as an aqueous medium, as a solvent-based medium, as a cast film-form, or as hot-melt granules. An example aqueous medium may include fillers, viscosity modifiers, and the like and have a solids content from about 10% to about 80% by weight, with the remaining weight being water. As an example, a single one of the layers 22 has an areal density of 20 grams per square meter to 500 grams per square meter.

Multiple layers 22 may be laminated together under heat and pressure to produce a laminate. For unidirectional arrangements of the fibers 24 in each layer 22, the layers 22 may be cross-plied in the lamination step, such as a 0°/90° configuration. The total number of layers 22 that are laminated together may depend on the end use article to be produced, but will typically be from two to 1000 of the layers 22, such as only two layers 22, up to 10 layers 22, up to 100 layers 22, or up to 250 layers 22. The thickness of the layers 22 will typically be from 25 micrometers to 0.001 meters. Two or more laminates are consolidated under heat and pressure to form a laminate armor. Except for the resin matrix 26, this process is otherwise known and those skilled in the art will thus recognize appropriate process conditions in view of this disclosure.

Aspects of the present disclosure are based on the concept that ballistic improvement in fiber-reinforced composite armor is achievable by modifying the sonic velocity of the ballistic panel "as a whole." Work relating to improving composite ballistic armor performance has focused not on this, but rather on optimizing the theoretical ballistic potential of the high-performance yarns within the composite, by optimizing the composite construction—i.e., via yarn spreading or via lower resin content construction and by via optimizing the surface interaction or the yarn with resin matrix.

The ballistic theory behind aspects of the present disclosure is as follows. If two identical fiber-reinforced composite armor panels were produced from orthogonal UD fabric using the same high-performance yarn, at the same fiber-fraction volume, and only differed in that the resin matrix of one had a higher sonic velocity than the other; it is predicted that that the one with the higher sonic velocity will ballistically outperform the other. This is established mathematically by van Heerden in U.S. Pat. No. 10,234,244, which can be used to predict the theoretical ballistic performance of a high-performance yarn constrained within a fiber-reinforced composite armor made from continuous unidirectional fibers. The ballistic performance of a yarn is a function of both its own elastic modulus and density and the sonic modulus and density of the resin matrix itself. This makes sense as the speed of sound through an anisotropic composite material will be some average of both the sound speed in the yarn and the sound speed in the resin.

Further, given the extremely high elastic moduli of ballistic yarns (e.g. ~75 GPa for Kevlar 29) relative to most standard composite resin matrices (0.2 GPa for LDPE), van Heerden also shows that resin matrix typically has a negative impact on the theoretical ballistic performance of the "constrained" yarn that the "negative impact" of the resin matrix can be minimized by:

A. Reducing the % interaction between the resin matrix and the ballistic yarn in the composite armor, and/or     B. By increasing the sonic velocity of the resin matrix—i.e. by increasing its modulus or by decreasing its density.

Aspects of the present disclosure address factor B above by incorporating of the relatively low density MA-g-PP. Since polypropylene has a density of only 0.92 g/cm$^3$ it effectively lowers the density of a resin matrix compared to more traditional polyurethane resins systems, with respective densities of greater than 1.00 g/cm$^3$. The reduction in resin density consequently increases the sonic velocity of the resin matrix given by the equation:

$$c_m = \sqrt{E_m/\rho_m}$$

Where:
    $c_m$=the sonic velocity of the resin matrix
    $E_m$=the sonic modulus of the resin matrix
    $\rho_m$=the density of the resin matrix The increase in sonic velocity facilitates improved ballistic performance for the ballistic resistant composite armor by increasing the speed at which longitudinal strain waves travel along the ballistic yarns thereby increasing the armor's ability to absorb and dissipate the kinetic energy of a ballistic projectile.

Aspects of the present disclosure are also based on the concept that ballistic improvement in fiber-reinforced composite armor is achievable by selectively increasing the level of adhesion between a resin matrix and ballistic fibers. This is counter-intuitive to ballistic composite design in that the paradigm is to have relatively low matrix-fiber adhesion. Thus, simply maximizing matrix-fiber adhesion is unlikely to yield better ballistic performance Moreover, in practicality, effectively increasing matrix-fiber adhesion for improved ballistic performance is challenging, especially for non-polar, low surface energy fibers, such as UHMWPE.

Increased matrix-fiber adhesion is accomplished herein by the use of the MA-g-PP, which serves as a coupling agent to the ballistic fibers, while at the same time bonding effectively to the polyurethane (if used). The mechanism of adhesion varies depending on the chemistry of the ballistic fiber. For non-polar ballistic fibers, such as UHMWPE, the maleic anhydride on the MA-g-PP modifies the chemical nature of different melt point/molecular weight (MP/MW) polypropylenes and/or polypropylene-block copolymers to increase their polarity. Although not wishing to be bound, the theory is that by grafting polypropylene with maleic anhydride, the non-polar (somewhat amorphous) polypropylene molecule becomes more polar and more crystalline. Hence, the nonpolar portion of the polymer can orient towards, and bond with, a nonpolar, low energy surface of a ballistic fiber. The polar groups can orient away from the ballistic fiber and may serve to bond with polar groups of polyurethane, if present. In that case, the MA-g-PP in essence serves as a coupling agent to bond the polyurethane to the ballistic fibers where previously there was no chemical bonds. For polar ballistic fibers, such as para-aramid fibers, free hydrogen and double bonded oxygen groups on the fiber surfaces form hydrogen bonds with the maleic anhydride, thus coupling the polypropylene of the MA-g-PP to the fibers.

Figure 3C:
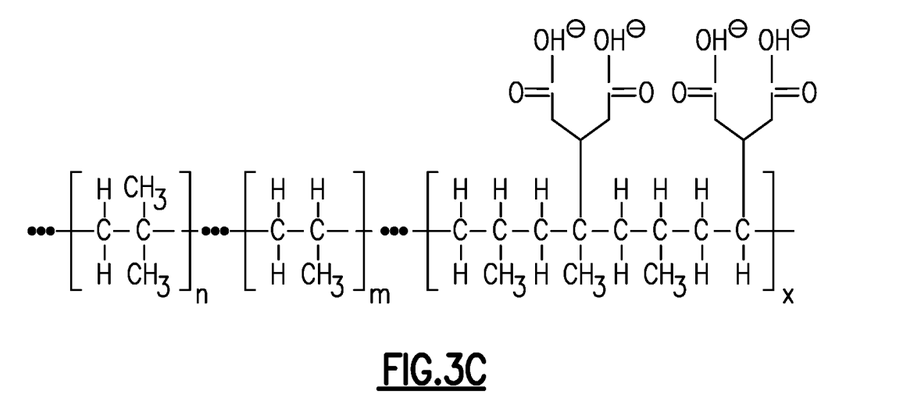
FIG. 3C illustrates a chemical structure for hydrolyzed maleic anhydride grafted polypropylene.

FIG. 3C shows the MA-g-PP of FIG. 3B after it has undergone hydrolysis. In the hydrolyzed state, the maleic anhydride is maleic acid and is functional for chemical bonding. Notably, the maleic acid groups also re-orient into an isotactic stereochemistry via rotation about the carbon-carbon bonds. This structural change makes the MA-g-PP polar, with the negatively charged maleic acid groups orientating to one side of the molecule and more crystalline (isotactic) in nature with all the of uncharged methyl groups of the polypropylene molecules orientating to the other side of the molecule.

Figure 4:
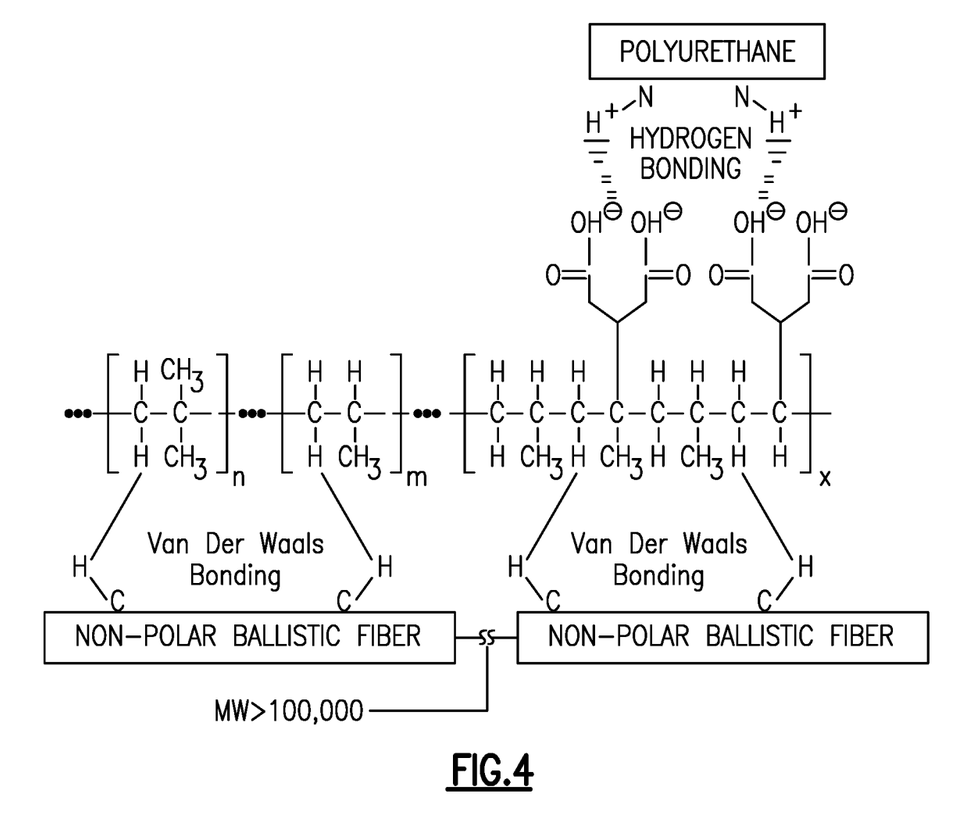
FIG. 4 illustrates how MA-g-PP block copolymer serves to form strong bonds with the polar reactive polyurethane and how the hydrocarbons of the MA-g-PP orient toward the non-polar hydrocarbons of the ballistic fiber.

FIG. 4 shows how MA-g-PP block copolymer serves to form strong bonds with the polar reactive polyurethane and how the hydrocarbons of the MA-g-PP orient toward the non-polar hydrocarbons of the ballistic fiber. Although Van Der Waals forces are generally relatively weak, at high molecular weights, such as over 100,000 MW of the non-polar hydrocarbon ballistic fiber, there is a relatively high number of Van Der Waals bonds. Thus, even though a single bond is relatively weak, the many bonds of the long MW length serve to provide a combined bond strength that is substantial. In FIG. 4 only hydrogen bonding of the maleic anhydride is shown, but ester linkages may also be present via functional alcohol groups (e.g., on polyurethane).

The Van Der Waals strength effect is similar to the effect that is responsible for high strength in UHMWPE. UHMWPE derives strength from the length of its individual molecules and the relatively weak Van Der Waals bonds between the molecules. This occurs because it is made up of extremely long chains of polyethylene that align such that each chain is bonded to the adjacent chains with so many Van Der Waals bonds that the whole system can support great tensile loads.

It is also possible that with enough heat the MA-g-PP will melt-bond to the surface of the ballistic fibers. Even below the melting point of either the fiber or the MA-g-PP, amorphous regions of each polymer may open such that the polymers locally intermix.

The maleic anhydride components of the MA-g-PP may also react with the aforementioned blocked isocyanates to crosslink and form chemical bonds. Such partial crosslinking further increases sonic modulus and tensile strength and thereby increases ballistic performance Cross-linking also results in ballistic armor panels that are stiffer and more environmentally stable.

EXAMPLE 1

An experiment was designed to compare the relative ballistic performance of different resin matrices. This experiment entailed making comparative hard composite armor panels out of 2-ply non-woven orthogonal UD fabric where only the resin matrix itself was varied. These composite panels were then ballistically tested to quantitatively compare their $V_{50}$ ballistic performances, and subsequently the relative ballistic efficiency of each resin system.

In this example, a two-ply non-woven composite was formed from layers of unidirectionally oriented 780 dtex (700 den) high tenacity UHMWPE yarn with a tenacity of 36 g/den (3.11 GPa) and a modulus of 1250 g/den (108.5 GPa). Unitapes were prepared by passing the fibers from a creel and through a combing station to form a unidirectional network. The fiber network was then placed on a carrier web and the fibers were coated separately with five different water-based resins:

Resin A was Prinlin and aqueous Styrene-Isoprene-Styrene (Kraton) resin system. Prinlin has been used in UHMWPE armor for years as it is ballistically efficient, but typically lacks the rigidity necessary for use in hard armor applications such has helmets and SAPI plates.

Resin B was a blend of low-melt point (40° C., 104° F.), high-elongation thermoplastic polyether-polyurethane, at 74% by weight, blended with a soft styrene-Isoprene-styrene (SIS) block copolymer at 18% by weight along with blocked isocyanate crosslinker at 8% by weight. No data on the tensile strength, elongation, or modulus of the TPU resin of this formulation was available. The blocked isocyanate was a water-based aliphatic blocked polyisocyanate with good thermal stability and high flexibility. Its base chemistry was HDI having an unblocking temperature of ~120° C. (248° F.).

Resin C was a commercially available polyether TPU commonly used in the manufacture UHMWPE armor with no X-linker added. This TPU had a tensile strength of 40 MPa, a modulus of 5 MPa and a % elongation of 1000%

Resin D was a commercially available polyester TPU with X-linker added @10% by weight. The TPU had a tensile strength of 28 MPa, a modulus of 2 MPa and a % elongation of 1000%. The blocked isocyanate was the same as used in Resin B.

Resin E was the same as Resin D but blended with MA-g-PP block copolymer. The MA-g-PP block copolymer had a molecular weight of 75000 g/mol a maleic acid content of 1.5% and constituted 30% of the resin matrix by weight.

The coated fiber network was then passed through an oven to evaporate the water in the composition and was wound onto a roller, with a carrier web. The resulting structure contained about 18% by weight of the resin matrix, based on the total weight of the composite. Two continuous rolls of unidirectional fiber prepregs, of each resin chemistry, A, B, C, D and E were prepared in this manner, and the corresponding unitapes were cross plied, along with the removal of the carrier webs to form 0°/90° consolidated UD orthogonal fabric rolls at a target areal density of 82 gsm. Panels of these five materials measuring 40 cm×40 cm (15.75"×15.75") were stacked into 119-layer panels and pressed at 130° C. (265° F.), at 214 bar (3000 psi) for 40 min respectively to form rigid consolidated hard armor ballistic composite panels. These flat panels were also cooled to room temperature under pressure prior to removal from the press. The resulting 119-layer panels had an approx. areal density of 9.765 kg/m$^2$ (2.0 psf) and were tested, clamped in a frame, air-backed, against 44 gn (30 cal) fragment simulating projectiles (FSPs) according to Mil-STD-662F. The ballistic results were then normalized to an areal density of 9.765 kg/m$^2$ (2.0 psf) and were as follows:

Panels pressed with resin A (SIS resin chemistry) had an average $V_{50}$ performance of 735 m/s (2412 fps).
Panels pressed with resin B (blended TPU with X-linker) had an average $V_{50}$ performance of 793 m/s (2602 fps).
Panels pressed with resin C (TPU no X-linker) had an average $V_{50}$ performance of 781 m/s (2562 fps).
Panels pressed with resin D (TPU with X-linker) had an average $V_{50}$ performance of 785 m/s (2576 fps).
Panels pressed with resin E (TPU+X-linker+MA-g-PP) had an average $V_{50}$ performance of 865 m/s (2838 fps).

EXAMPLE 2

In this example the three of the 0°/90° consolidated UD orthogonal fabrics, with different resin matrices, from Example 1 were used to compare the relative ballistic efficiency of each resin system when pressed under different pressures vs. 17 gn FSP projectiles.

In this example the three resin systems tested were Resin B, Resin C, and Resin E from Example 1. Each of these UD orthogonal fabrics was cut into 40 cm×40 cm (15.75"×15.75") sheets, stacked into 90-layer panels and pressed at 130° C. (265° F.), at both 28.6 bar (400 psi) and 214 bar (3000 psi) for 35 min respectively to form rigid consolidated hard armor ballistic composite panels. These flat panels were also cooled to room temperature under pressure prior to removal from the press. The resulting 90-layer panels had an approx. areal density of 7.32 kg/m$^2$ (1.50 psf) and were tested, clamped in a frame, air-backed, against 17 gn (22 cal) fragment simulating projectiles (FSPs) according to Mil-STD-662F. The ballistic results were then normalized to an areal density of 7.32 kg/m$^2$ (1.50 psf) and were as follows:

The Resin B (blended TPU with X-linker) panels had an average $V_{50}$ performance of 743 m/s (2438 fps) when pressed at 28.6 bar (400 psi) and a $V_{50}$ ballistic bump of ~10% to 821 m/s (2694 fps) when pressed at 214 bar (3000 psi).
The Resin C (TPU no X-linker) panels had an average $V_{50}$ performance of 708 m/s (2323 fps) when pressed at 28.6 bar (400 psi) and a $V_{50}$ ballistic bump of ~14% to 808 m/s (2651 fps) when pressed at 214 bar (3000 psi).
The Resin E (TPU+X-linker+MA-g-PP) panels had an average $V_{50}$ performance of 754 m/s (2474 fps) when pressed at 28.6 bar (400 psi) and a $V_{50}$ ballistic bump of ~19.5% to 901 m/s (2956 fps) when pressed at 214 bar (3000 psi).
Resin E, which combined MA-g-PP block copolymer with the base TPU resin, therefore had the best $V_{50}$ ballistic performance, 9.7% better than TPU without M MA-g-PP block copolymer added, and exhibited the biggest $V_{50}$ performance improvement of 19.5% when comparing the $V_{50}$ performance of panels pressed at relatively low (400 psi) pressure, and identical panels pressed at relatively high pressures (i.e. 3000 psi). This testing also seems to indicate that resin matrices with blocked isocyanate crosslinker perform better than those without when pressed at lower pressures <400 psi.

In the following examples a number of new resin matrices analogous to Resin E in the above examples were formulated and made into consolidated UD orthogonal fabrics in an attempt to determine a preferred version of this invention. These resins differed in the amount of MA-g-PP block copolymer used in the formulation, in the molecular weight of the MA-g-PP block copolymer used in the formulation and the in the weight percentage of maleic anhydride used to make the MA-g-PP block copolymer.

EXAMPLE 3

In this example a 4-ply non-woven composite was formed from layers of unidirectionally oriented 1650 dtex (1485 den) high tenacity UHMWPE yarn with a tenacity of 40 g/den (3.43 GPa) a modulus of 1300 g/den (111.3 GPa) and a % elongation of 3%. Unitapes were prepared by passing the fibers from a creel and through a combing station to form a unidirectional network. The fiber network was then placed on a carrier web and the fibers were coated separately with 2 different water-based resins:

Resin E was the same as in the above examples, i.e.: a blend of TPU, X-linker and MA-g-PP block copolymer. The TPU had a tensile strength of 28 MPa, a modulus of 2 MPa and a % elongation of 1000%. The blocked isocyanate was a water-based aliphatic blocked polyisocyanate at 10% by weight, and the MA-g-PP block copolymer had a molecular weight of 75000 g/mol a maleic acid content of 1.5% and constituted 30% of the resin matrix by weight.
Resin F was the same as Resin E above except that the MA-g-PP block copolymer had a molecular weight of 75000 g/mol a maleic acid content of 3.0% vs. 1.5%.

The coated fiber network was then passed through an oven to evaporate the water in the composition and was wound onto a roller, with a carrier web. The resulting structure contained about 16% by weight of the resin matrix, based on the total weight of the composite. Two continuous rolls of unidirectional fiber prepregs, of each resin chemistry, E and F were prepared in this manner, and the corresponding unitapes were cross-plied, along with the removal of the carrier webs to form 2-layer 0°/90° UD orthogonal fabrics, which were then laminated to themselves to form 4-layer 0°/90°/0°/90° consolidated UD orthogonal fabric rolls at a target areal density of 160 gsm. Panels of these two materials measuring 40 cm×40 cm (15.75"×15.75") were stacked into both 46-layer panels and 105-layer panels. These panels were then pressed at 130° C. (265° F.), at 214 bar (3000 psi) for 35 min and 55 min respectively to form rigid consolidated hard armor ballistic composite panels. These flat panels were also cooled to room temperature under pressure prior to removal from the press. The resulting 46-layer panels had an approx. areal density of 7.32 kg/m$^2$ (1.50 psf) and were tested, clamped in a frame, air-backed, against 17 gn (22 cal) fragment simulating projectiles (FSPs) according to Mil-STD-662F. The resulting 105-layer panels had an approx. areal density of 16.8 kg/m$^2$ (3.44 psf) and were tested, clamped in a frame, air-backed, against 7.62×39 mm, Type 56 Ball, FMJ MSC, 123 grains (0.30 caliber) rifle rounds according to Mil-STD-662F. The ballistic results were then normalized to 7.32 kg/m² and 16.8 kg/m² respectively and were as follows:

The Resin E panels had an average $V_{50}$ performance of 770 m/s (2526 fps) vs. 17 gn FSPs and an average $V_{50}$ performance of 751 m/s (2464 fps) vs. 7.62×39 mm rifle rounds.

The Resin F panels, with twice the amount of maleic anhydride, had an average $V_{50}$ performance of 800 m/s (2625 fps) vs. 17 gn FSPs and an average $V_{50}$ performance of 774 m/s (2540 fps) vs. 7.62×39 mm rifle rounds.

Hence the higher maleic acid formulation showed a 3.1 to 3.8% ballistic improvement over one with only 1.5% maleic acid by weight.

EXAMPLE 4

In this example a 4-ply non-woven composite was formed from layers of unidirectionally oriented 1650 dtex (1485 den) high tenacity UHMWPE yarn with a tenacity of 40 g/den (3.43 GPa) a modulus of 1300 g/den (111.3 GPa) and a % elongation of 3%. Unitapes were prepared by passing the fibers from a creel and through a combing station to form a unidirectional network. The fiber network was then placed on a carrier web and the fibers were coated separately with 2 different water-based resins:

Resin G was the same as Resin E above in the above except that the MA-g-PP block copolymer had a molecular weight of 60,000 g/mol a maleic acid content of 2.0%.

Resin H was the same as Resin E above in the above except that the MA-g-PP block copolymer had a high molecular weight of 90,000 g/mol a maleic acid content of 1.5%.

Then identical to Example 3 above, 4-layer, 160 gsm, 0°/90°/0°/90° consolidated UD orthogonal fabric rolls were made using these two new resins systems and from these, ballistic panels were then constructed. The resulting 46-layer, Resin G and Resin H panels had an approx. areal density of 7.32 kg/m² (1.50 psf) and were tested, clamped in a frame, air-backed, against 17 gn (22 cal) fragment simulating projectiles (FSPs) according to Mil-STD-662F. The resulting 105-layer, Resin G and Resin H panels had an approx. areal density of 16.8 kg/m² (3.44 psf) and were tested, clamped in a frame, air-backed, against 7.62×39 mm, Type 56 Ball, FMJ MSC, 123 grains (0.30 caliber) rifle rounds according to Mil-STD-662F. The ballistic results were then normalized to 7.32 kg/m² and 16.8 kg/m² respectively and were as follows:

The lower molecular weight Resin G panels had an average $V_{50}$ performance of 779 m/s (2556 fps) vs. 17 gn FSPs and an average $V_{50}$ performance of 807 m/s (2464 fps) vs. 7.62×39 mm rifle rounds.

The higher molecular weight Resin H panels had an average $V_{50}$ performance of 775 m/s (2543 fps) vs. 17 gn FSPs and an average $V_{50}$ performance of only 649 m/s (2129 fps) vs. 7.62×39 mm rifle rounds.

The lower molecular weight MA-g-PP block copolymer resin (Resin G) exhibited much better ballistic performance vs. the higher molecular weight MA-g-PP block copolymer formulation (Resin H) when tested against high-energy (~2595 Joule) rifle rounds that require the composite armor panels to deform significantly (due to tensile strain and cone formation) as part of its energy absorption/energy dissipation mechanism. No significant difference however was noted between the two resin systems, G and H, when tested against relatively low energy 0.22 caliber (~334 Joule) FSP's. The rationale for this, is that composite panels impacted by small, low energy FSP's undergo a different energy absorption/energy dissipation mechanism than those impacted by high energy projectiles. Some of the better performance exhibited by Resin G panels can also be attributed to this formulation's slightly higher maleic anhydride content.

EXAMPLE 5

In this example a 4-ply non-woven composite was formed from layers of unidirectionally oriented 1650 dtex (1485 den) high tenacity UHMWPE yarn with a tenacity of 40 g/den (3.43 GPa) a modulus of 1300 g/den (111.3 GPa) and a % elongation of 3%. Unitapes were prepared by passing the fibers from a creel and through a combing station to form a unidirectional network. The fiber network was then placed on a carrier web and the fibers were coated separately with 3 different water-based resins:

Resin E was the same as in the above examples, with MA-g-PP block copolymer that constituted 30% of the resin matrix by weight.

Resin I was similar to Resin E, but with MA-g-PP block copolymer that constituted 13% of the resin matrix by weight.

Resin J was similar to Resin E, but with MA-g-PP block copolymer that constituted 42% of the resin matrix by weight.

Then identical to Example 3 above, 4-layer, 160 gsm, 0°/90°/0°/90° consolidated UD orthogonal fabric rolls were made using these three resins systems and from these, ballistic panels were constructed. The resulting 46-layer, Resin E, Resin I and Resin J panels had an approx. areal density of 7.32 kg/m² (1.50 psf) and were tested, clamped in a frame, air-backed, against 17 gn (22 cal) fragment simulating projectiles (FSPs) according to Mil-STD-662F. The resulting 105-layer Resin E, Resin I and Resin J panels had an approx. areal density of 16.8 kg/m² (3.44 psf) and were tested, clamped in a frame, air-backed, against 7.62×39 mm, Type 56 Ball, FMJ MSC, 123 grains (0.30 caliber) rifle rounds according to Mil-STD-662F. The ballistic results were then normalized to 7.32 kg/m² and 16.8 kg/m², respectively. The results of this testing found there to be no significant difference in the ballistic performance of these three resins systems despite their varying levels of MA-g-PP block copolymer. All of the to 7.32 kg/m² panels had $V_{50}$ result in the range of 780 m/s vs. 17 gn FSP's and all the 16.8 kg/m² panels had $V_{50}$ result in the range of 750 m/s vs. the 7.62×39 mm rifle rounds. This indicates that even small amounts of MA-g-PP block copolymer added to a TPU formulation can be beneficial; also, that the resin system is not particularly sensitive, from a ballistic efficiency standpoint, to the amount of compatible MA-g-PP block copolymer in resin matrix.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A ballistic-resistant composite comprising:
   at least one layer including a network of ballistic fibers and a resin matrix, the resin matrix including maleic anhydride-grafted polypropylene (MA-g-PP), the MA-g-PP having a molecular weight of 30,000 to 80,000, the network of ballistic fibers including ultra-high molecular weight polyethylene fibers, and the MA-g-PP having, by weight, 0.5% to 5% of maleic anhydride.

2. The ballistic-resistant composite as recited in claim 1, wherein the maleic anhydride-grafted polypropylene is maleic anhydride-grafted polypropylene block copolymer.

3. The ballistic-resistant composite as recited in claim 1, wherein the resin matrix additionally includes polyurethane.

4. The ballistic-resistant composite as recited in claim 3, wherein the resin matrix includes, by weight, 1% to 70% of the MA-g-PP.

5. The ballistic-resistant composite as recited in claim 4, wherein the resin matrix includes, by weight, 25% to 50% of the MA-g-PP.

6. The ballistic-resistant composite as recited in claim 4, wherein the polyurethane includes a blocked isocyanate composed of isocyanate bonded with a blocking agent selected from the group consisting of wherein the blocking agent is selected from the group consisting of phenol, nonyl phenol, β-dicarbonyl compounds, methylethylketoxime, alcohols, ε-caprolactam, amides, imidazoles, pyrazoles, and combinations thereof.

7. The ballistic-resistant composite as recited in claim 1, wherein the at least one layer includes, by weight, from 5% to 40% of the resin matrix.

8. The ballistic-resistant composite as recited in claim 1, wherein the at least one layer includes two of the layers laminated together.

9. The ballistic-resistant composite as recited in claim 1, wherein the MA-g-PP has, by weight, 1% to 4% of maleic anhydride.

10. The ballistic-resistant composite as recited in claim 1, wherein the at least one layer has a single layer that has an areal density of 20 grams per square meter to 500 grams per square meter.

11. The ballistic-resistant composite as recited in claim 1, wherein the resin matrix additionally includes polyurethane, the resin matrix includes, by weight, 25% to 50% of the MA-g-PP, and the at least one layer has a single layer that has an areal density of 20 grams per square meter to 500 grams per square meter.

12. The ballistic-resistant composite as recited in claim 1, wherein the resin matrix additionally includes polyurethane, the resin matrix includes, by weight, 25% to 50% of the MA-g-PP, the at least one layer includes, by weight, from 5% to 40% of the resin matrix, and the at least one layer has a single layer that has an areal density of 20 grams per square meter to 500 grams per square meter.

* * * * *